United States Patent [19]
Miyagi et al.

[11] Patent Number: 5,005,411
[45] Date of Patent: Apr. 9, 1991

[54] SHIFT CONTROL ARRANGEMENT FOR MANUAL TRANSMISSION

[75] Inventors: Junichi Miyagi, Aichi; Isao Shimazu, Anjo, both of Japan

[73] Assignees: Toyota Jidosha Kabushiki Kaisha, Toyota; Banno Kogyo Kabushiki Kaisha, Okazaki, both of Japan

[21] Appl. No.: 437,614

[22] Filed: Nov. 17, 1989

[30] Foreign Application Priority Data

Nov. 17, 1988 [JP] Japan ................. 63-290736

[51] Int. Cl.⁵ .............. G05G 9/00; B60K 41/00; F16C 1/10
[52] U.S. Cl. .............. 74/473 R; 74/471 XY; 74/500.5; 74/501.6
[58] Field of Search .......... 74/471 XY, 473 R, 500.5, 74/501.6

[56] References Cited

U.S. PATENT DOCUMENTS

| | | | |
|---|---|---|---|
| 4,143,560 | 3/1979 | Kinkade et al. | 74/473 R |
| 4,270,403 | 6/1981 | West | 74/473 R |
| 4,483,211 | 11/1984 | Hurlow | 74/473 R |
| 4,583,417 | 4/1986 | Hurlow | 74/501.6 X |

FOREIGN PATENT DOCUMENTS 3531780  3/1986  Fed. Rep. of Germany ..... 74/500.5
61-99744  5/1986  Japan .
61-110221  5/1986  Japan .

Primary Examiner—Allan D. Herrmann
Assistant Examiner—David W. Laub
Attorney, Agent, or Firm—Oblon, Spivak, McClelland, Maier & Neustadt

[57] ABSTRACT

A manual transmission shift control arrangement adapted for use in combination with a remotely operated shift mechanism operatively connected thereto by means of a pair of push-pull cables. The shift control arrangement includes a support shaft horizontally mounted on a vehicle body structure for rotation about a first axis, a manual shift control lever having a lower end mounted on the support shaft for rotation about a second axis orthogonal to the first axis, a drive bevel gear integrally mounted to the lower end of the control lever for rotation therewith, a pair of axially spaced driven bevel gears mounted on the support shaft for rotation therewith and being in meshing engagement with the drive bevel gear, and a pair of power take-off bevel gears rotatably mounted on an upstanding support shaft secured to the vehicle body structure and being in meshing engagement with the driven bevel gears, the power take-off bevel gears each having an arm portion for connection with each of the push-pull cables.

9 Claims, 6 Drawing Sheets

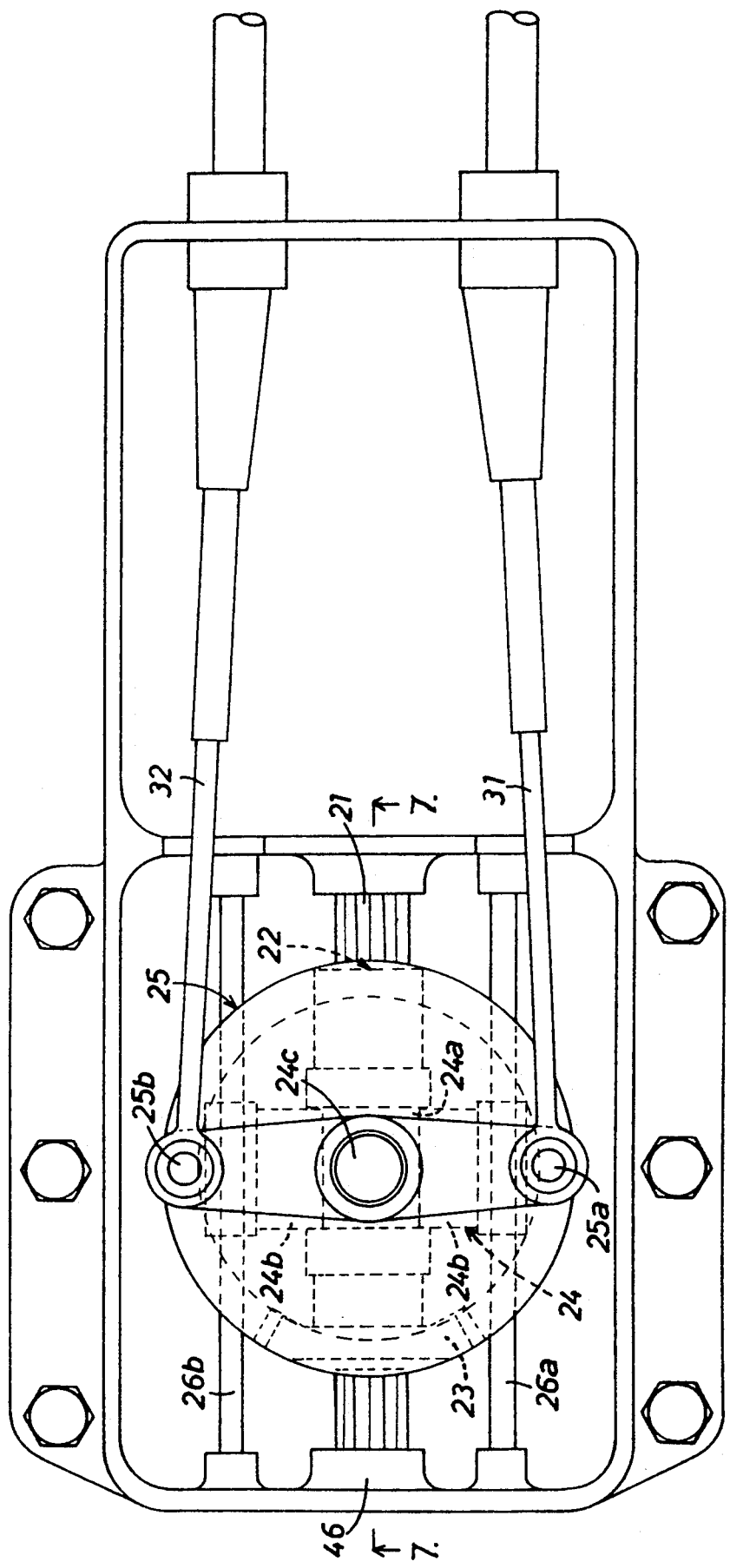

SHIFT CONTROL ARRANGEMENT FOR MANUAL TRANSMISSION

BACKGROUND OF THE INVENTION

1. Field of the Invention

The present invention relates to a shift control arrangement for manual transmissions and, more particularly, to a shift control arrangement of the dual cable type for manual transmissions.

2. Description of the Prior Art

In Japanese Patent Early Publication Nos. 61-99744 and 61-110221, there has been proposed a manual transmission shift control arrangement wherein a manual shift control lever is pivotally mounted on the floor of a motor vehicle at an intermediate point thereof to be selectively moved in a fore-and-aft direction and in a left-and-right direction and is operatively connected to a remotely operated shift mechanism by means of a pair of flexible push-pull cables. In the shift control arrangement, the shift control lever is provided at the lower end thereof with an arm member which is connected at its diametrically opposite ends to the push-pull cables. The arm member is further pivotally connected to one end of a swingable rod the other end of which is pivotally mounted on the vehicle body structure.

In operation, the component parts of the shift control arrangement will be distorted or stuck due to complicated and irregular movements at their pivoted portions. This will check smooth operation of the shift control lever. In the case that the manual shift control lever is arranged to be moved at a predetermined lever ratio for making the stroke amount and operation force thereof in a desired value, the shift control arrangement becomes large in size particularly due to the provision of the swingable rod.

SUMMARY OF THE INVENTION

It is, therefore, a primary object of the present invention to provide an improved manual transmission shift control arrangement capable of overcoming the drawbacks described above.

A secondary object of the present invention is to provide an improved manual transmission shift control arrangement in combination with a remotely operated shift mechanism which is constructed small in size at a low cost.

According to the present invention there is provided a manual transmission shift control arrangement adapted for use in combination with a remotely operated shift mechanism operatively connected thereto by means of a pair of push-pull cables, wherein the shift control arrangement includes a support shaft horizontally mounted on a vehicle body structure for rotation about a first axis, a manual shift control lever having a lower end mounted on the support shaft for rotation about a second axis orthogonal to the first axis, a drive bevel gear integrally mounted to the lower end of the control lever for rotation therewith, a pair of axially spaced driven bevel gears mounted on the support shaft for rotation therewith and being in meshing engagement with the drive bevel gear, and means for operatively connecting the driven bevel gears to the push-pull cables.

In a practical embodiment of the present invention, the shift control lever is integrally provided at the lower end thereof with a fork which is rotatably mounted on a support member orthogonal to an intermediate portion of the support shaft, and the drive bevel gear is fixed to one end of the york for rotation therewith. For operatively connecting the driven bevel gears to the push-pull cables, a pair of power take-off bevel gears are rotatably mounted on an upstanding support shaft secured to the vehicle body structure and positioned in meshing engagement with the driven gears. The power take-off bevel gears each are integrally formed with an arm portion for connection with each of the push-pull cables. Furthermore, it is preferable that the remotely operated shift mechanism includes a housing mounted on a casing of the transmission, a support shaft mounted within the housing, a slider axially slidably mounted on the support shaft, a shift lever integrally provided with the slider and extending into the interior of the transmission casing for selective engagement with a plurality of shift rods, a first bevel gear mounted on the slider for rotation therewith, a second bevel gear rotatably mounted on the slider and being in meshing engagement with the first bevel gear, the second bevel gear being provided thereon with a pair of diametrically spaced support pins for connection with the push-pull cables.

BRIEF DESCRIPTION OF THE DRAWINGS

Additional objects, features and advantages of the present invention will be readily appreciated from the following detailed description of a preferred embodiment thereof when taken together with the accompanying drawings, in which:

FIG. 6 is an enlarged plan view of the remotely operated shift mechanism shown in FIGS. 1 and 2;

DESCRIPTION OF THE PREFERRED EMBODIMENT

Figure 1:
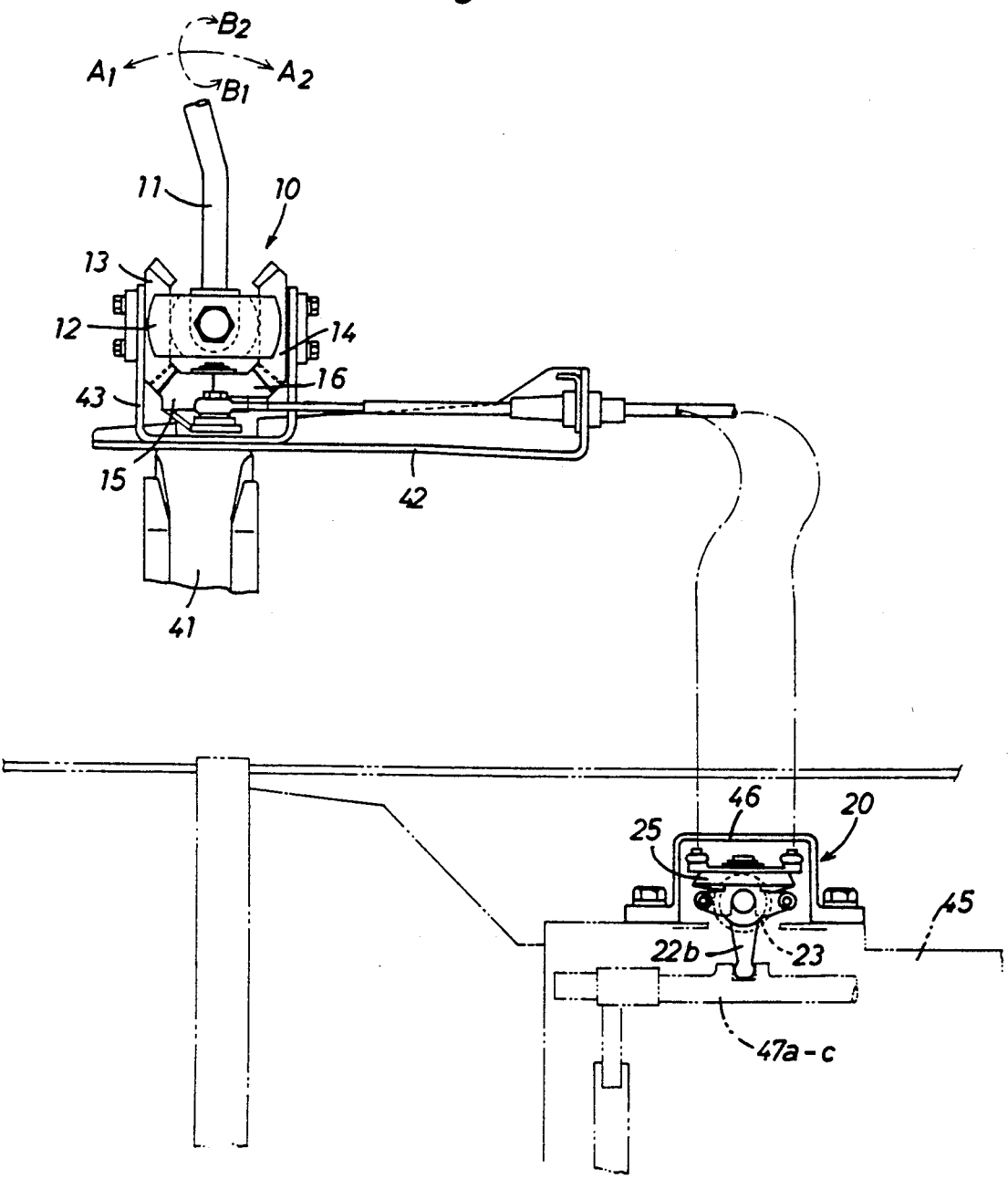
FIG. 1 is a side view of a manual transmission shift control arrangement in combination with a remotely operated shift mechanism.
Figure 2:
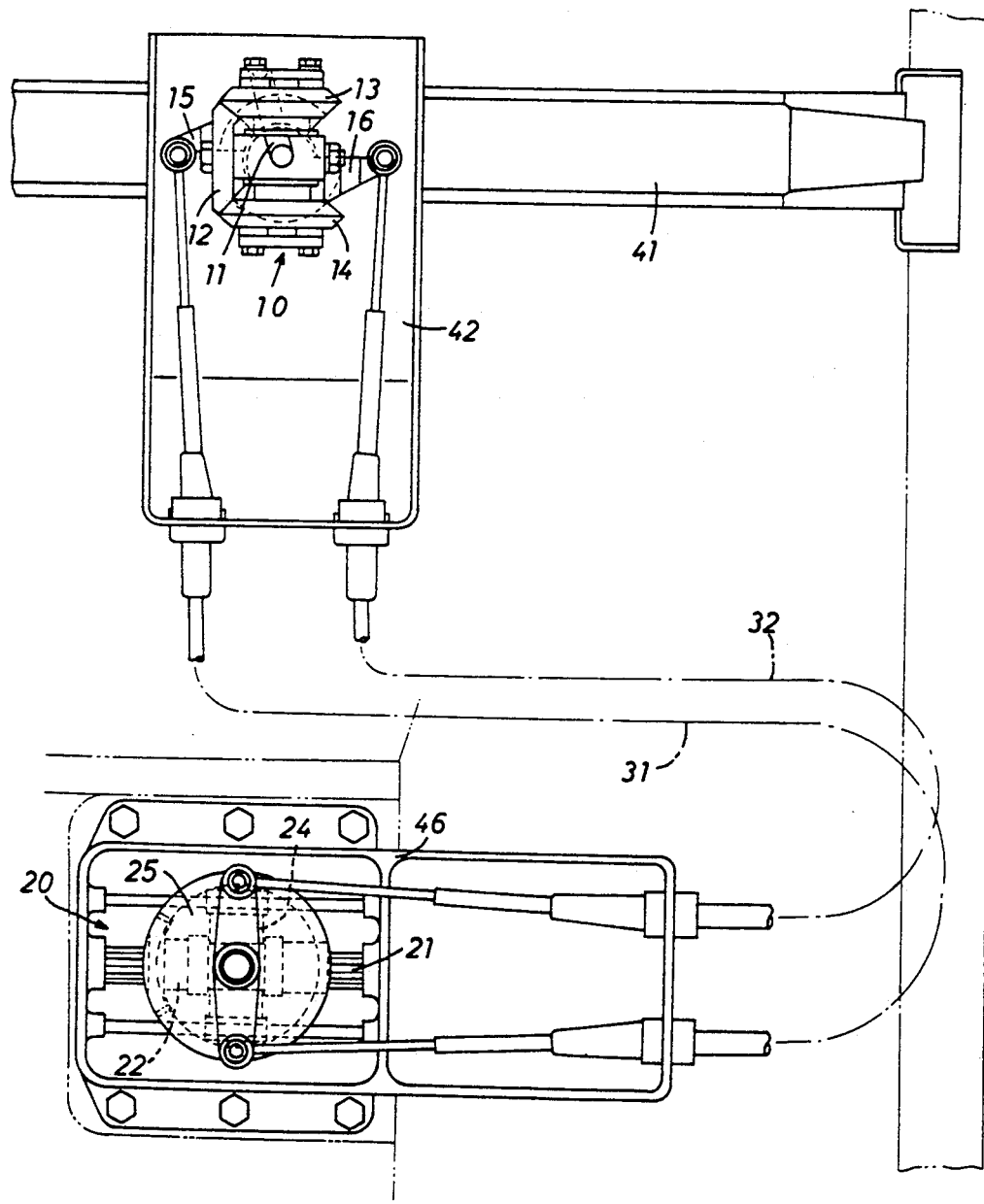
FIG. 2 is a plan view of the shift control arrangement and the remotely operated shift mechanism.

In FIGS. 1 and 2 of the drawings there is illustrated a manual transmission shift control arrangement 10 which is operatively connected to a remotely operated shift mechanism 20 by means of a pair of flexible push-pull cables 31 and 32. The shift control arrangement 10 is assembled with an upstanding bracket 43 of U-letter shaped cross-section which is secured to a brace member 41 of a vehicle body structure through a base plate 42. The shift control arrangement 10 includes a manual shift control lever 11, a drive bevel gear 12, a pair of axially spaced driven bevel gears 13, 14, and a pair of power take-off bevel gears 15, 16. As shown clearly in FIG. 3, a stepped support shaft 17 has an intermediate portion 17a integral with a support sleeve 17b and is horizontally mounted on the upstanding bracket 43 through a pair of axially spaced bearings 44a and 44b for rotation about a first axis. The driven bevel gears 13 and 14 are mounted on the support shaft 17 for rotation therewith.

Figure 3:
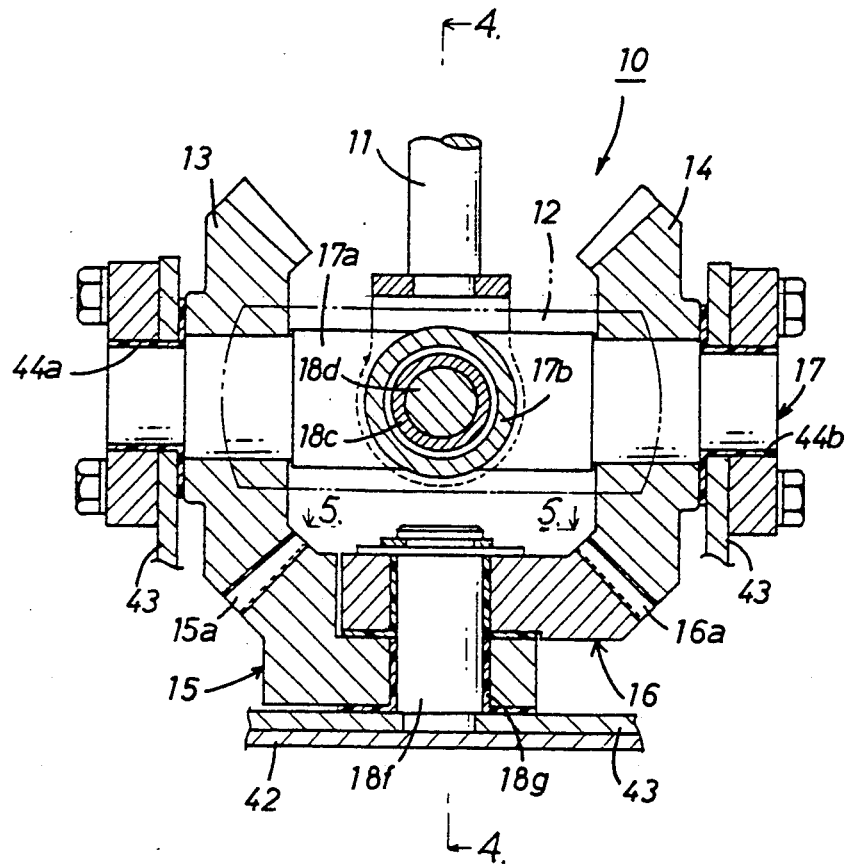
FIG. 3 is an enlarged sectional view of the shift control arrangement shown in FIGS. 1 and 2.
Figure 4:
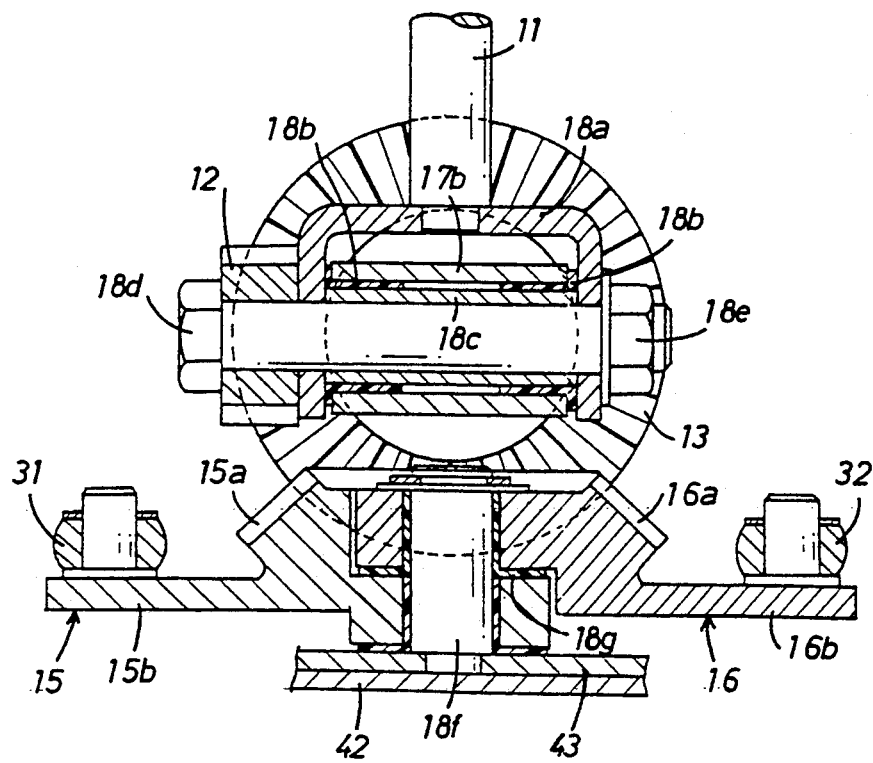
FIG. 4 is a cross-sectional view of the shift control arrangement taken along line 4—4 in FIG. 3.

As shown clearly in FIG. 4, a york 18a of U-letter shaped cross-section is secured to the lower end of shift control lever 11, and the support sleeve 17b is arranged in a direction orthogonal to the intermediate portion 17a of support shaft 17. A collar 18c is coupled within the support sleeve 17b through a pair of axially spaced synthetic resin bushing 18b, and a bolt 18d is inserted into the collar 18c. The york 18a and drive bevel gear 12 are mounted on the bolt 18d and fixed to each other by means of a nut 18e fastened to the bolt 18d. Thus, the drive bevel gear 12 is arranged to rotate with the york 18a about a second axis orthogonal to the first axis. As shown clearly in FIGS. 2 and 3, the drive bevel gear 12 is positioned in meshing engagement with the driven bevel gears 13 and 14 in such a manner that the shift control lever 11 can be rotated about the axis of bolt 18d when operated in a direction shown by arrows $A_1$ and $A_2$ in FIG. 3 and can be rotated about the axis of support shaft 17 when operated in a direction shown by arrows $B_1$ and $B_2$ in FIG. 4.

Figure 5:
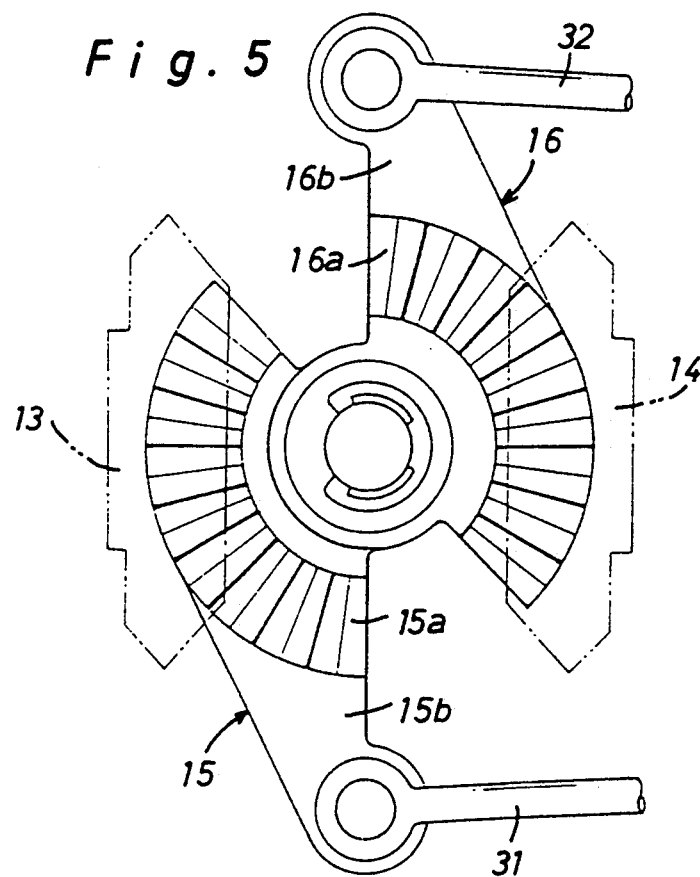
FIG. 5 is a plan view of the shift control arrangement taken along line 5—5 in FIG. 3.

As shown clearly in FIGS. 3 and 4, an upstanding support shaft 18f is secured to the bottom portion of bracket 43. The power take-off bevel gears 15 and 16 are rotatably supported by the upstanding support shaft 18f through a synthetic resin bushing 18g and overlapped in a vertical direction. The bevel gear 15 is maintained in meshing engagement with the driven bevel gear 13, while the bevel gear 16 is maintained in meshing engagement with the drive bevel gear 14. As shown clearly in FIGS. 4 and 5, the bevel gear 15 has an arm portion 15b extending radially outwardly from its toothed portion 15a, while the bevel gear 16 has an arm portion 16b extending radially outwardly from its toothed portion 16a. The arm portions 15b and 16b are arranged in a diametrically opposite direction and connected at their movable ends to the push-pull cables 31 and 32, respectively.

Figure 7:
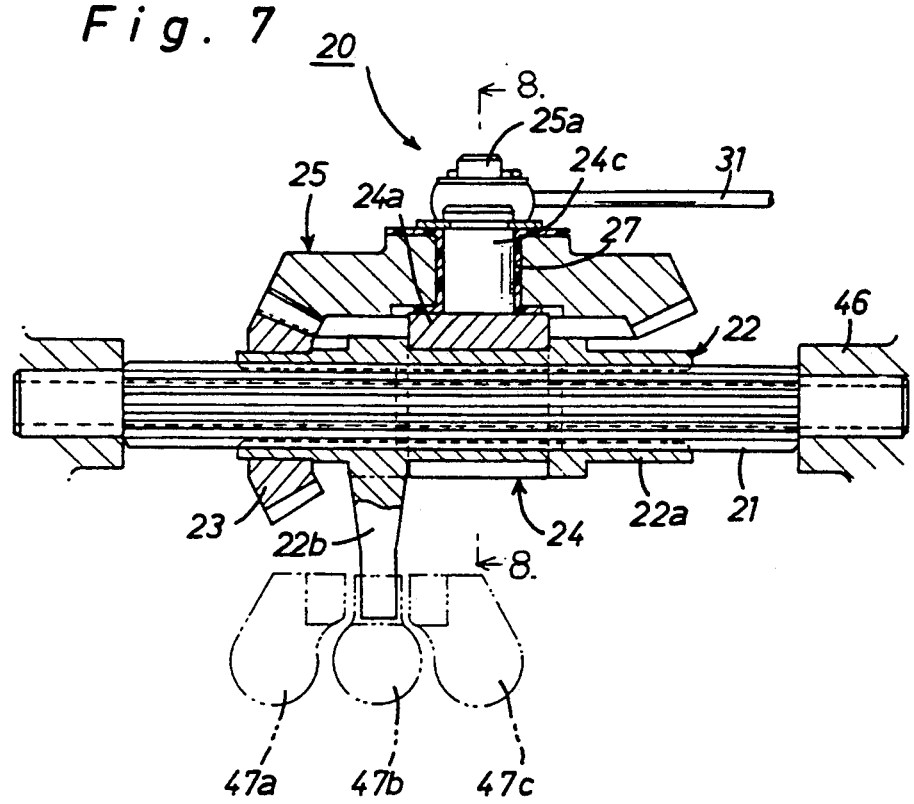
FIG. 7 is a cross-sectional view of the shift mechanism taken along 7—7 in FIG. 6.

As shown clearly in FIG. 1, the remotely operated shift mechanism 20 is assembled within a housing 46 mounted on a transmission casing 45. As shown clearly in FIGS. 6-8, the shift mechanism 20 includes a support shaft 21, a slider 22, a bevel gear 23, a support body 24 and a bevel gear 25. As shown clearly in FIG. 6, the support shaft 21 is externally splined and rotatably mounted within the housing 46. The slider 22 is axially slidably mounted on the support shaft 21. As shown clearly in FIGS. 7 and 8, the slider 22 has a sleeve portion 22a splined to the support shaft 21 and a shift lever portion 22b extending perpendicularly from the sleeve portion 22a. The shift lever portion 22b of slider 22 extends into the interior of transmission casing 45 to be selectively engaged with three parallel shift rods 47a, 47b and 47c. The bevel gear 23 is mounted on one end of sleeve portion 22a of slider 22 for rotation therewith, and the bevel gear 25 is mounted on the center of sleeve portion 22a through the support body 24.

Figure 8:
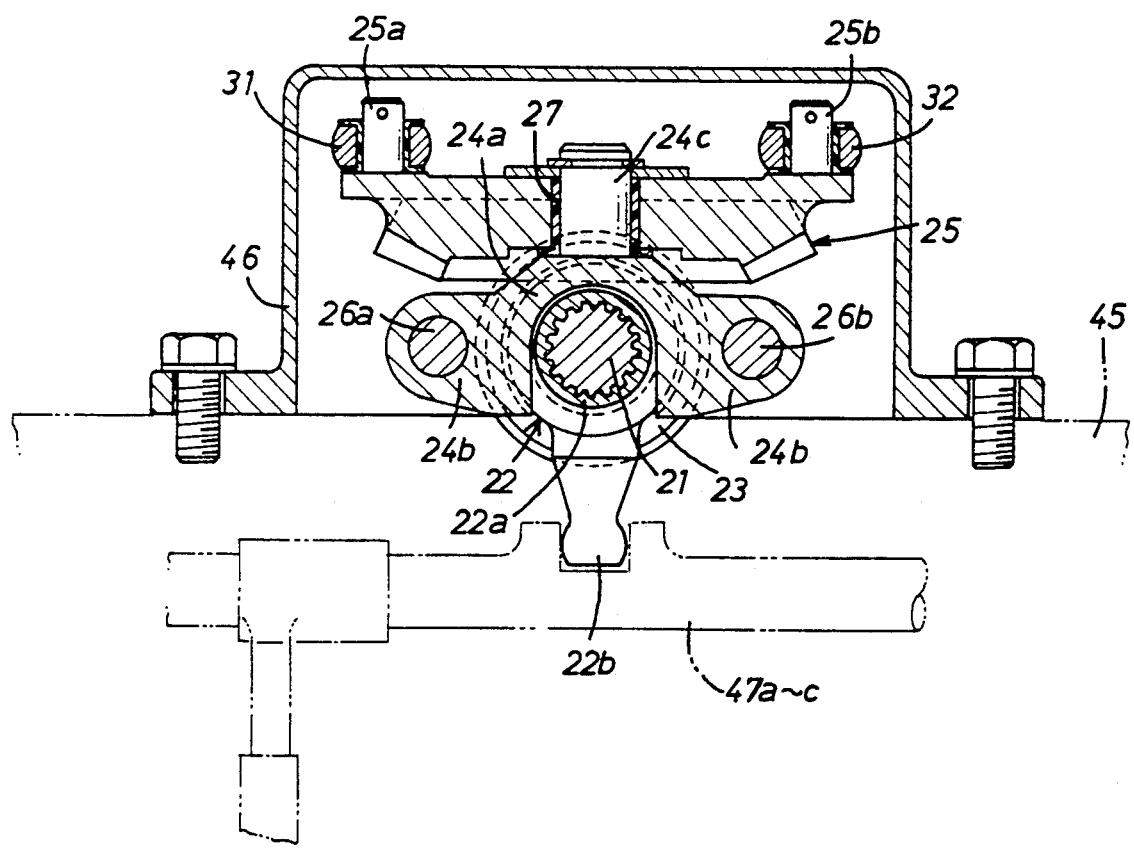
FIG. 8 is a cross-sectional view of the shift mechanism taken along 8—8 in FIG. 7.

As shown clearly in FIG. 8, the support body 24 has a body portion 24a formed with a recess for receiving therein the sleeve portion 22a of slider 22, a pair of arm portions 24b extending radially outwardly from the body portion 24a, and an upstanding support shaft 24c integrally provided on the body portion 24a. Thus, the support body 24 is assembled with the slider 22 by engagement with the sleeve portion 22a of slider 22 at its body portion 24a and is axially slidably supported at its arm portions 24b by means of a pair of parallel guide rods 26a, 26a which are mounted within the housing 46 in parallel with the support shaft 21 as shown in FIG. 6. The bevel gear 25 is rotatably mounted on the upstanding support shaft 24c of support body 24 through a synthetic resin bushing 27, and positioned in meshing engagement with the bevel gear 23. The bevel gear 25 has a pair of diametrically spaced support pins 25a and 25b provided thereon for connection with the push-pull cables 31 and 32.

In the remotely operated shift mechanism, shift movement of the shift lever 22b is caused by operation of the shift control lever 11 in the direction shown by arrows $A_1$ and $A_2$ in FIG. 3, and select movement of the shift lever 22b is caused by operation of the shift control lever 11 in the direction shown by arrows $B_1$ and $B_2$ in FIG. 4. When the shift control lever 11 is moved in the direction shown by the arrow $A_1$ or $A_2$ in FIG. 3, the drive bevel gear 12 rotates with the shift control lever 11 to cause rotation of the driven bevel gears 13 and 14 relatively in a reverse direction. As a result, the power take-off bevel gears 15 and 16 are rotated in the same direction to draw one of the cables 31, 32 rearwardly and to push the other cable forwardly. Such movement of the push-pull cables 31, 32 is transmitted to the bevel gear 25 of shift mechanism 20 to rotate the bevel gear 23. Thus, the slider 22 rotates with the bevel gear 23 to cause shift movement of the shift lever 22b selectively engaged with one of the shift rods 47a, 47b, 47c.

When the shift control lever 11 is moved in the direction shown by the arrow $B_1$ or $B_2$ in FIG. 4, the driven bevel gears 13 and 14 rotate with the drive bevel gear 12 in the same direction to cause rotation of the power take-off bevel gears 15 and 16 relatively in a reverse direction. As a result, both the push-pull cables 32 and 32 are drawn rearwardly or pushed forwardly. Such movement of the push-pull cables 31, 32 is transmitted to the bevel gear 25 of shift mechanism 20 to cause axial movement of the slider 22, bevel gear 23 and support body 24 on the support shaft 21. Thus, the shift lever 22b is selectively engaged with one of the shift rods 47a, 47b and 47c.

From the above description, it will be understood that all the bevel gears 12-16 are arranged to transmit movement of the shift control lever 11 to the push-pull cables 31, 32 therethrough. The arrangement of bevel gears 12-16 is useful to effect smooth operation of the shift control lever 11 without causing any distortion or stick of the component parts of the shift control arrangement 10 and to equally apply the operation force of the shift control lever 11 to the push-pull cables 31, 32. Furthermore, the shift control arrangement 10 can be constructed small in size because of the small number of the component parts. Similarly to the shift control mechanism 10, the shift mechanism 20 can be constructed small in size and can be smoothly operated without causing any distortion or sticking of the component parts thereof.

In the shift control mechanism 10, the stroke amount and operation force of the shift control lever 11 can be easily adjusted by selection of the gear ratios between the bevel gears 12-16. Additionally, the take-off direction of the power can be easily changed by an appropriate arrangement of the arm portions 15b, 16b of bevel gears 15, 16.

Although the preferred embodiment of the present invention has been shown and described above, it should be understood that various other modifications and rearrangements of the parts may be resorted to without departing from the scope of the invention as disclosed and claimed herein. For example, the driven bevel gears 13, 14 may be provided with an arm portion respectively for connection with the push-pull cables 31, 32 without providing the power take-off bevel gears 15, 16.

What is claimed is:

1. A manual transmission shift control arrangement adapted for use in combination with a remotely operated shift mechanism operatively connected thereto by means of a pair of push-pull cables, comprising:

a support shaft horizontally mounted on a vehicle body structure for rotation about a first axis;
   a manual shift control lever having a lower end mounted on said support shaft for rotation about a second axis orthogonal to the first axis;
   a drive bevel gear integrally mounted to the lower end of said control lever for rotation therewith;
   a pair of axially spaced driven bevel gears mounted on said support shaft for rotation therewith and being in meshing engagement with said drive bevel gear; and
   means for operatively connecting said driven bevel gears to said push-pull cables.

2. A manual transmission shift control arrangement as claimed in claim 1, wherein the lower end of said manual shift control lever is rotatably mounted on a support member orthogonal to an intermediate portion of said support shaft.

3. A manual transmission shift control arrangement as claimed in claim 1, wherein said manual shift control lever is integrally provided at the lower end thereof with fork which is rotatably mounted on a support member orthogonal to an intermediate portion of said support shaft, and wherein said drive bevel gear is fixed to one end of said york for rotation therewith.

4. A manual transmission shift control arrangement as claimed in claim 1, wherein said means for operatively connecting said driven bevel gears to said push-pull cables comprises a pair of power take-off bevel gears rotatably mounted on the vehicle body structure and being in meshing engagement with said driven bevel gears, said power take-off bevel gears each having an arm portion for connection with each of said push-pull cables.

5. A manual transmission shift control arrangement as claimed in claim 1, wherein said remotely operated shift mechanism comprises a support shaft mounted on a transmission casing, a slider axially slidably mounted on said second-named support shaft, a shift lever integrally provided with said slider and extending into the interior of said transmission casing for selective engagement with a plurality of shift rods; a first bevel gear mounted on said slider for rotation therewith; a second bevel gear rotatably mounted on said slider and being in meshing engagement with said first bevel gear, said second bevel gear being provided thereon with a pair of diametrically spaced support pins for connection with said push-pull cables.

6. A manual transmission shift control arrangement as claimed in claim 5, wherein said second-named support shaft is mounted within a housing on said transmission casing, and wherein said second bevel gear is rotatably mounted on a support body carried by said slider on said second-named support shaft.

7. A manual transmission shift control arrangement as claimed in claim 6, wherein said support body has a pair of arm portions axially slidably carried by a pair of guide rods mounted within said housing in parallel with said second-named support shaft.

8. A remotely operated shift mechanism for a manual transmission adapted for use in combination with a shift control arrangement operatively connected thereto by means of a pair of push-pull cables, comprising:

a housing mounted on a transmission casing ;
   a support shaft mounted within said housing;
   a slider axially slidably mounted on said support shaft;
   a shift lever integrally provided with said slider and extending into the interior of said transmission casing for selective engagement with a plurality of shift rods;
   a first bevel gear mounted on said slider for rotation therewith;
   a second bevel gear rotatably mounted on said slider and being in meshing engagement with said first bevel gear, said second bevel gear being provided thereon with a pair of diametrically spaced support pins for connection with said push-pull cables.

9. A remotely operated shift mechanism as claimed in claim 8, wherein said second bevel gear is rotatably mounted on a support body carried by said slider on said support shaft, said support body having a pair of arm portions axially slidably carried by a pair of guide rods mounted within said housing in parallel with said support shaft.

* * * * *